US010013173B2

(12) United States Patent
More et al.

(10) Patent No.: US 10,013,173 B2
(45) Date of Patent: Jul. 3, 2018

(54) DATA STORAGE DEVICE WITH COMMAND BUFFER MANAGEMENT MODULE AND METHOD OF OPERATING SAME

(71) Applicant: SanDisk Technologies LLC, Plano, TX (US)

(72) Inventors: Shankar More, Pune (IN); Kapil Sundrani, Bangalore (IN)

(73) Assignee: SANDISK TECHNOLOGIES LLC, Plano, TX (US)

( * ) Notice: Subject to any disclaimer, the term of this patent is extended or adjusted under 35 U.S.C. 154(b) by 410 days.

(21) Appl. No.: 14/812,619

(22) Filed: Jul. 29, 2015

(65) Prior Publication Data
US 2017/0031592 A1 Feb. 2, 2017

(51) Int. Cl.
*G06F 3/06* (2006.01)
*G06F 13/42* (2006.01)

(52) U.S. Cl.
CPC .............. *G06F 3/061* (2013.01); *G06F 3/067* (2013.01); *G06F 3/0659* (2013.01); *G06F 13/4286* (2013.01)

(58) Field of Classification Search
CPC ........ G06F 3/061; G06F 3/0659; G06F 3/067; G06F 13/4286
USPC .............................................................. 710/5
See application file for complete search history.

(56) References Cited

U.S. PATENT DOCUMENTS

| | | | | |
|---|---|---|---|---|
| 5,121,479 A | * | 6/1992 | O'Brien | G06F 3/0601 710/34 |
| 5,751,969 A | * | 5/1998 | Kapoor | H04Q 11/0478 370/235 |
| 6,311,257 B1 | * | 10/2001 | Fitzgerald | G06F 3/0608 710/1 |
| 7,103,888 B1 | * | 9/2006 | Cayton | G06F 13/102 709/213 |
| 8,244,939 B2 | | 8/2012 | Wewel | |
| 8,423,722 B1 | * | 4/2013 | Deforest | G06F 3/0688 711/148 |
| 2007/0094691 A1 | * | 4/2007 | Gazdzinski | H04N 7/17318 725/62 |
| 2007/0208899 A1 | * | 9/2007 | Freking | G06F 13/4031 710/313 |
| 2008/0125874 A1 | * | 5/2008 | Takahashi | G05B 19/4061 700/7 |

(Continued)

*Primary Examiner* — Christopher Shin
(74) *Attorney, Agent, or Firm* — Patterson & Sheridan, LLP; Steven Versteeg

(57) ABSTRACT

An electronic device including a communication interface and a command buffer coupled to the communication interface. The communication interface is configured to receive commands from a plurality of initiator devices, and the command buffer is configured to store the commands. The electronic device further includes a command buffer management module coupled to the command buffer. The command buffer management module is configured to generate a message indicating a remaining allowed storage size associated with the command buffer. The communication interface is further configured to enable communication of the message to a particular initiator device of the plurality of initiator devices. The message may enable the particular initiator device to hold off on sending one or more other commands to the command buffer if the remaining allowed storage size fails to satisfy a threshold storage size.

23 Claims, 6 Drawing Sheets

(56) References Cited

U.S. PATENT DOCUMENTS

| | | | |
|---|---|---|---|
| 2008/0183908 A1* | 7/2008 | Slater | G06F 9/544 |
| | | | 710/11 |
| 2010/0262715 A1* | 10/2010 | Tamalet | H04L 67/16 |
| | | | 709/238 |
| 2013/0339599 A1 | 12/2013 | Sundrani | |
| 2014/0164715 A1 | 6/2014 | Weiner et al. | |
| 2014/0215108 A1* | 7/2014 | Pandit | G06F 13/4282 |
| | | | 710/105 |
| 2015/0281270 A1* | 10/2015 | Istomin | H04L 63/1441 |
| | | | 726/23 |

* cited by examiner

DATA STORAGE DEVICE WITH COMMAND BUFFER MANAGEMENT MODULE AND METHOD OF OPERATING SAME

FIELD OF THE DISCLOSURE

This disclosure is generally related to data storage devices and more particularly to command buffering processes for data storage devices.

BACKGROUND

Non-volatile storage devices have enabled increased portability of data and software applications. In some systems, a storage device is configured to communicate with (e.g., may be "shared" by) multiple accessing devices. In some cases, a relatively large number of requests from the multiple accessing devices may temporarily slow processing of the requests by the storage device. For example, the storage device may return a "busy" message to a particular accessing device when the storage device is processing a relatively large number of requests. The accessing device may wait and retry the operation by retransmitting the command, which may add latency (or "lag") to the system. Further, transmission of a "busy" message (and retransmission of commands) may use bandwidth of the system. As a result, performance of a system may be slowed.

DETAILED DESCRIPTION

Figure 1:
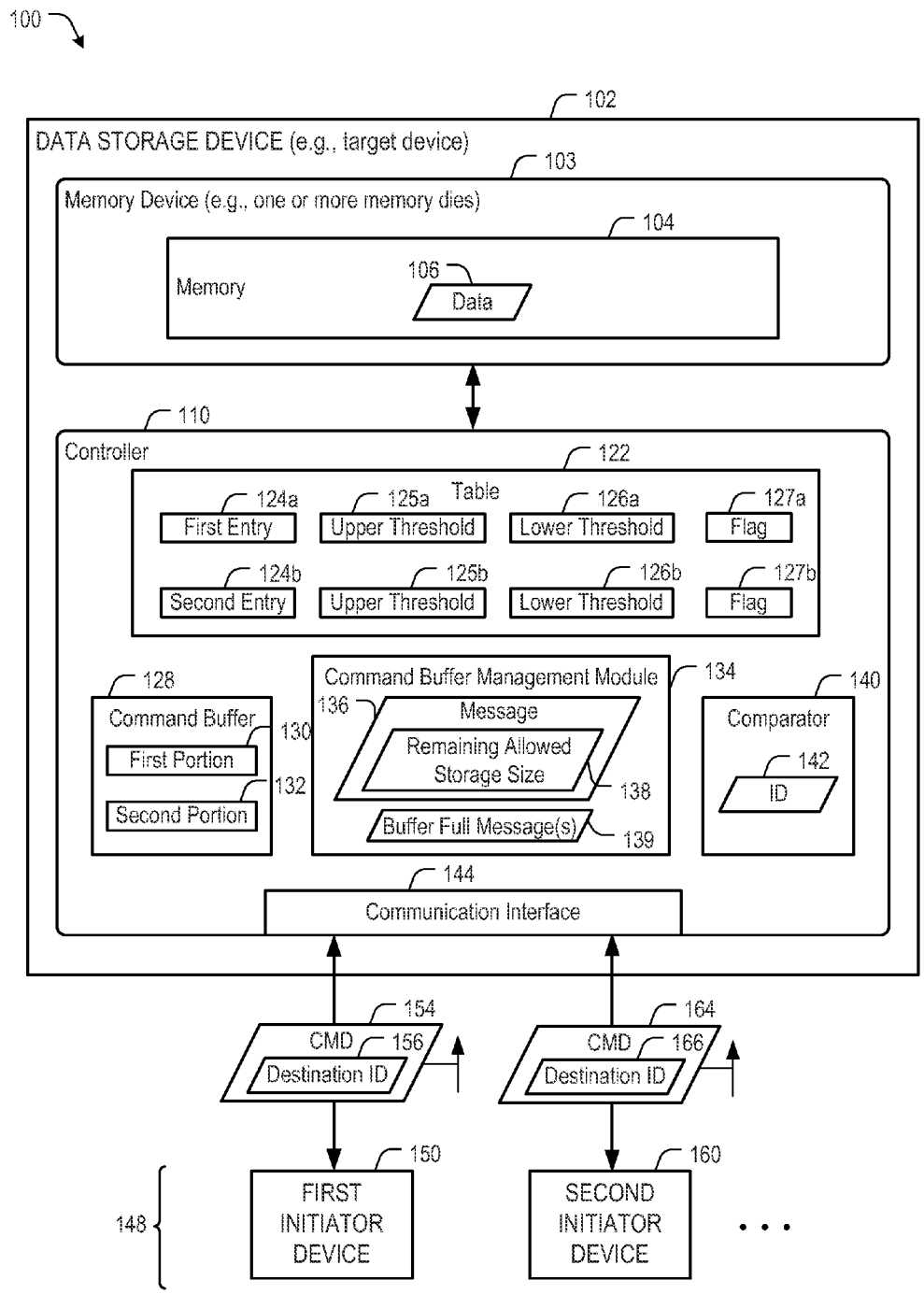
FIG. 1 is a block diagram illustrating certain aspects of an illustrative example of a system including a data storage device having a command buffer and a command buffer management module.

An electronic device may include a command buffer and a command buffer management module that manages use of the command buffer to a plurality of initiator devices. The plurality of initiator devices may access the command buffer (e.g., to queue commands at the command buffer) in accordance with a communication protocol, such as a small computer system interface (SCSI) communication protocol, as a non-limiting illustrative example.

The command buffer management module may generate a message indicating a remaining allowed storage size of the command buffer for an initiator device. To illustrate, if the initiator device sends a command (e.g., a request for read access or write access to a memory of the electronic device), the command buffer may generate a message indicating a remaining allowed storage size of the command buffer that is reserved for the initiator device. In some implementations, the command buffer management module may include the message in a response to the command, such as in a data frame provided to the initiator device in response to a request for read access to the memory.

Indicating the remaining allowed storage size to the initiator device may reduce or avoid instances of "monopolization" of the command buffer by the initiator device. For example, instead of sending "buffer full" messages in response to commands received while the command buffer is "full," indicating the remaining allowed storage size to the initiator device may enable the initiator device to delay or avoid sending the command (e.g., until the command buffer management module indicates to the initiator device that the remaining allowed storage size has increased, such as due to processing or "clearing" of commands stored at the command buffer). Avoiding or delaying sending the command may reduce or avoid transmission of a "buffer full" message, which may decrease utilization of system bandwidth. Further, managing use of the command buffer based on the remaining allowed storage size may reduce or avoid instances of the initiator device "monopolizing" the command buffer at the expense of one or more other initiator devices of the plurality of initiator devices.

As used herein, a "remaining allowed storage size" of the command buffer may refer to a size of a portion of the command buffer that is reserved to store additional subsequent commands from a particular initiator device and that is represented to the particular initiator device, and "available storage size" of the command buffer may refer to a "real" size of the command buffer that is empty and that can store additional subsequent commands (if allowed by the command buffer management module). In some cases, a linear mapping may be used to determine a remaining allowed storage size as a function of available storage size. For example, in a "one-to-one" linear mapping, if the available storage size is equal to one, then the remaining allowed storage size may be equal to one. In this example, as available storage size of the command buffer increases (or decreases) by a particular amount, the command buffer management module may increase (or decrease) the remaining allowed storage size by the particular amount. In some cases, a non-linear mapping or a constant mapping of remaining allowed storage size to available storage size may be used (so that the relation of remaining allowed storage size to available storage size is not "one-to-one"). Further, mapping of remaining allowed storage size to available storage size may be programmable (e.g., via a firmware update) based on the particular application, which may facilitate configuration of the command buffer management module based on the particular application.

Particular aspects of the present disclosure are described below with reference to the drawings. In the description, common features are designated by common reference numbers. As used herein, "examplary" may indicate an example, an implementation, and/or an aspect, and should not be construed as limiting or as indicating a preference or a preferred implementation.

FIG. 1 depicts an illustrative example of a system 100. The system 100 includes a data storage device 102 (e.g., an electronic device) and a plurality of initiator devices 148 including a first initiator device 150 and a second initiator device 160. In some implementations, the initiator devices 150, 160 may correspond to separate physical devices (e.g., accessing devices). In other cases, the initiator devices 150, 160 may correspond to logical devices included in a single physical device (e.g., logical devices or virtual devices of a single accessing device). Further, although FIG. 1 illustrates one data storage device (the data storage device 102) and two initiator devices (the initiator devices 150, 160), in other cases the system 100 may include a different number of initiator devices (e.g., three or more initiator devices), a different number of data storage devices (e.g., two or more data storage devices), or both.

The data storage device 102 may include a memory device 103. The memory device 103 may include one or more storage devices (e.g., one memory die, two memory dies, eight memory dies, or another number of memory dies).

The memory device 103 includes a memory 104, such as a volatile memory or a non-volatile memory included in a memory die of the memory device 103. For example, the memory 104 may include a flash memory, such as a NAND flash memory, or a resistive memory, such as a resistive random access memory (ReRAM), as illustrative examples. The memory 104 may have a three-dimensional (3D) memory configuration. As an example, the memory 104 may have a 3D vertical bit line (VBL) configuration. In a particular implementation, the memory 104 is a non-volatile memory having a 3D memory configuration that is monolithically formed in one or more physical levels of arrays of memory cells having an active area disposed above a silicon substrate. Alternatively, the memory 104 may have another configuration, such as a two-dimensional (2D) memory configuration or a non-monolithic 3D memory configuration (e.g., a stacked die 3D memory configuration).

An example of a storage element is a block, such as a NAND flash erase group of storage elements (e.g., memory cells). Another example of a storage element is a word line of storage elements. A word line may function as a single-level-cell (SLC) word line, as a multi-level-cell (MLC) word line, or as a tri-level-cell (TLC) word line, as illustrative examples. Each storage element of a word line may be programmable to a state (e.g., a threshold voltage in a flash configuration or a resistive state in a resistive memory configuration) that indicates one or more values.

The data storage device 102 may further include a controller 110 coupled to the memory device 103. The controller 110 may store a table 122, such as at a random access memory (RAM) of the controller 110. The controller 110 may include a command buffer 128 (e.g., a command queue), a command buffer management module 134, a comparator 140, and a communication interface 144 (e.g., an input/output (I/O) interface). The communication interface 144 is coupled to the first initiator device 150 and to the second initiator device 160. The command buffer management module 134 is coupled to the command buffer 128, and the command buffer 128 is coupled to the communication interface 144.

The system 100 may operate in compliance with one or more communication protocols. For example, one or more components of the system 100 (e.g., the communication interface 144) may be configured to operate in compliance with a small computer system interface (SCSI) communication protocol, a serial advanced technology attachment (SATA) communication protocol, or another communication protocol. The data storage device 102 may be referred to as (or may include) a target device. In some cases, the data storage device 102 may include multiple target devices (e.g., multiple blocks of the memory 104, multiple word lines of the memory 104, or multiple dies of the memory device 103). A target device may correspond to a logical or virtual device or a physical device. The communication interface 144 may be referred to as (or may include) a storage fabric. For example, a transport layer of the communication interface 144 may be referred to as a storage fabric, such as a storage fabric of a network attached storage (NAS) device or an enterprise data storage system, as illustrative examples.

During operation, the controller 110 is configured to receive data and commands from the initiator devices 150, 160 to access the memory 104. For example, the controller 110 may receive data 106 from the first initiator device 150 via the communication interface 144 or from the second initiator device 160 via the communication interface 144. The data 106 may include one or more files (e.g., an image file, an audio file, and/or a video file, as illustrative examples) and/or other information to be stored at the data storage device 102. The controller 110 may send the data 106 to the memory device 103 to be stored at the memory 104 (e.g., after encoding the data 106). The controller 110 may also be configured to receive a command from the one of the initiator devices 150, 160 and to retrieve the data 106 from the memory 104 in response to the command.

The communication interface 144 is configured to receive commands or to enable reception of commands from the plurality of initiator devices 148. For example, the communication interface 144 may be configured to receive or to enable reception of a particular command (e.g., a first command 154, such as a first I/O command) from a particular initiator device (e.g., the first initiator device 150). As another example, the communication interface 144 may be configured to receive or enable reception of a second command 164 (e.g., a second I/O command from the second initiator device 160. To further illustrate, the commands 154, 164 may include requests to read from or to write to particular destinations of the memory 104 indicated by destination identifiers 156, 166 (e.g., logical addresses of logical blocks, or other identification information). As used herein, the communication interface 144 may enable reception of messages using one or more active components (e.g., one or more drivers, one or more coder/decoders (CODECs), one or more devices that operate a protocol stack to retrieve data or messages, one or more other components, or a combination thereof), using one or more passive components (e.g., an electrical connection that receives signals, another component, or a combination thereof), or both.

The command buffer 128 is configured to store (e.g., queue) commands received from the plurality of initiator devices 148. For example, the controller 110 may store one or both of the commands 154, 164 at the command buffer 128 (e.g., while one or more other tasks are being performed at the memory 104).

The command buffer management module 134 may be configured to generate a message 136 in response to the communication interface 144 receiving a command. The message 136 may indicate a remaining allowed storage size 138 associated with the command buffer 128. To illustrate, if the command buffer 128 has a storage capacity equal to s commands (where s indicates a positive number), then the remaining allowed storage size 138 of the command buffer 128 may be equal to s−2 after storing the commands 154, 164 at the command buffer 128 (if no other commands are stored at the command buffer 128). In this example, the message 136 may indicate s−2 (e.g., the remaining allowed storage size 138 may be equal to s−2). For example, a particular communication protocol may define a messaging protocol to indicate the remaining allowed storage size 138, such as by defining a field of a message reserved for the remaining allowed storage size 138 and/or by defining a particular opcode of the message 136. The remaining allowed storage size 138 may be indicated using a set of bits that indicates a value of the remaining allowed storage size 138, as an illustrative example.

In some cases, the command buffer management module 134 may be configured to generate the message 136 in response to the data storage device 102 receiving a command (but not processing the command), such as in response to receiving the first command 154 from the first initiator device 150 or in response to receiving the second command 164 from the second initiator device 160. In other implementations, the command buffer management module 134 may be configured to generate the message 136 in response to the data storage device 102 processing a command, such as in response to performing a read operation or a write operation indicated by the first command 154 or in response to performing a read operation or a write operation indicated by the second command 164. In this case, the message 136 may be included in a response, such as a response indicating success or failure of an operation indicated by a command or a data frame that includes data (e.g., the data 106) read from the memory 104 based on a command.

In some implementations, the message 136 may be included in (or may correspond to) a message that complies with a particular communication protocol. As an illustrative example, the communication interface 144 may be configured to operate in compliance with a SCSI communication protocol, and the message 136 may be included in (or may correspond to) a response frame that complies with the SCSI communication protocol. In other cases, the message 136 may comply with another communication protocol, such as a SATA communication protocol, as an illustrative example.

The communication interface 144 is configured to enable communication of the message 136 to a particular initiator device of the plurality of initiator devices 148. For example, the communication interface 144 may enable communication of the message 136 to the first initiator device 150 in response to receiving the first command 154 from the first initiator device 150. As another example, the communication interface 144 may enable communication of the message 136 to the second initiator device 160 in response to receiving the second command 164 from the second initiator device 160. As used herein, the communication interface 144 may enable communication of the message 136 using one or more active components (e.g., one or more drivers, one or more CODECs, one or more devices that operate a protocol stack to send data or messages, one or more other components, or a combination thereof), using one or more passive components (e.g., an electrical connection that sends signals, another component, or a combination thereof), or both.

The message 136 may enable one or more of the plurality of initiator devices 148 to "hold off on" (e.g., delay or avoid) sending one or more other commands to the command buffer 128 if the remaining allowed storage size 138 fails to satisfy (e.g., does not exceed) a threshold storage size. For example, if the threshold storage size is equal to zero, then the threshold storage size may be satisfied if s≥1. As another example, if the threshold storage size is equal to one, then the threshold storage size may be satisfied if s≥2. Alternatively, the threshold storage size may be equal to another value.

To further illustrate, if the remaining allowed storage size 138 is relatively small, the first initiator device 150 may avoid or delay sending a command to the data storage device 102 until storage availability at the command buffer 128 is increased (e.g., due processing of one or more commands stored at the command buffer 128). In this example, the command buffer management module 134 may send a message to the first initiator device 150 indicating an increased available storage size associated with the command buffer 128. Avoiding or delaying sending a command may reduce congestion and traffic between the data storage device 102 and the initiator devices 150, 160. In some implementations, one or more of the initiator devices 150, 160 may store a table. For example, the first initiator device 150 may store a table indicating remaining allowed storage sizes of command buffers of a plurality of storage devices. The first initiator device 150 may select one or more command targets (e.g., one or more other data storage devices included in the system 100 not shown in FIG. 1) using the table (e.g., by avoiding one or more command targets having a relatively low remaining allowed storage size).

In some implementations, the remaining allowed storage size 138 may be used on a "global" basis (e.g., by each initiator device of the plurality of initiator devices 148). In this example, the remaining allowed storage size 138 may be "broadcast" to each of the plurality of initiator devices 148. For example, the message 136 may be "broadcast" to each of the plurality of initiator devices 148.

In other implementations, the remaining allowed storage size 138 may be specific to a particular initiator device. To illustrate, the command buffer 128 may include portions that are "reserved" for particular initiator devices, such as a first portion 130 that may be reserved for the first initiator device 150 and a second portion 132 that may be reserved for the second initiator device 160. In this example, if the message 136 is generated in response to the first command 154, the message 136 may be sent to the first initiator device 150, and the remaining allowed storage size 138 may correspond to a remaining allowed storage size of the first portion 130. Alternatively, if the message 136 is generated in response to second command 164, the message 136 may be sent to the second initiator device 160, and the remaining allowed storage size 138 may correspond to a remaining allowed storage size of the second portion 132. As used herein, the portions 130, 132 may refer to storage sizes of the command buffer 128 that may be reserved for the initiator devices 150, 160 (rather than particular physical regions of the command buffer 128).

In an illustrative implementation, the comparator 140 is configured to compare the destination identifiers 156, 166 of the commands 154, 164 to an identifier 142 assigned to the communication interface 144. For example, if the system 100 includes multiple data storage devices, the comparator 140 may compare the destination identifiers 156, 166 to the identifier 142 to determine that the commands 154, 164 are addressed to the data storage device 102 (and not to another data storage device 102 that may be included in the system 100).

In some implementations, the table 122 includes information associated with the command buffer 128. For example, the table 122 may store a first entry 124a, such as an indication of the remaining allowed storage size 138. The command buffer management module 134 may be configured to monitor the command buffer 128 to determine when one or more commands are processed (or are "cleared" from the command buffer 128), such as by "snooping" the command buffer (or by snooping source fields of commands stored at the command buffer 128). The command buffer management module 134 may be further configured to access the table 122 and to update the table 122, such as by modifying the first entry 124a in response to receiving and/or processing commands by the data storage device 102.

In other cases, the first entry 124a may be independent of (or may not have a "one-to-one" relation with) the number of commands stored at the first portion 130.

In some implementations, the table 122 may include entries for each of the plurality of initiator devices 148. As an example, the first entry 124a (and the remaining allowed storage size 138) may correspond to a particular initiator device, such as the first initiator device 150. In this example, the first entry 124a may indicate a remaining allowed storage size of the first portion 130. As another example, the table 122 may include a second entry 124b indicating a second remaining allowed storage size of the second portion 132, and the second portion 132 may be reserved for the second initiator device 160.

In an illustrative implementation, the table 122 indicates an upper threshold 125a of a number of commands associated with the first initiator device 150 that may be stored at the command buffer 128. The number of commands is also referred to herein as an "acquired queue depth" of the first initiator device 150. The command buffer management module 134 may be configured to "flag" the first initiator device 150 in response to the number of commands exceeding the upper threshold 125a. For example, the command buffer management module 134 may assert a flag 127a (e.g., by changing a bit from a logic zero value to a logic one value) at the table 122 to indicate that the number of commands has exceeded the upper threshold 125a.

The command buffer management module 134 may send a "queue full" message to the first initiator device 150 in response to one or more commands received from the first initiator device 150 while the flag 127a is asserted. For example, the command buffer management module 134 may "refuse" one or more commands from the first initiator device 150 (instead of storing the one or more commands at the command buffer 128). The command buffer management module 134 may send a buffer full message 139 to the first initiator device 150 (e.g., to indicate that the first portion 130 is "full") in response to the one or more commands. The buffer full message 139 may indicate that a remaining allowed storage size of the command buffer 128 for the first initiator device 150 is zero.

After asserting the flag 127a, the remaining allowed storage size indicated by the first entry 124a may decrease (e.g., due to processing of commands associated with the first initiator device 150 and because additional commands are not added to the command buffer 128 while the flag 127a is asserted). The command buffer management module 134 may be configured to detect that the number of commands associated with the first initiator device 150 is less than a lower threshold 126a. Once the number of commands is less than the lower threshold 126a, the command buffer management module 134 may allow the first initiator device 150 to resume buffering of commands at the command buffer 128. For example, the command buffer management module 134 may de-assert the flag 127a. The command buffer management module 134 may also send a message to the first initiator device 150 indicating the increased remaining allowed storage size (e.g., that the remaining allowed storage size is greater than one, or another number) and may cease to generate buffer full messages if commands are received from the first initiator device 150. Thus, the command buffer management module 134 may be configured to generate the buffer full message 139 in response to the number of commands being greater than the upper threshold 125a until the number of commands is less than the lower threshold 126a. FIG. 1 also depicts that the table 122 may indicate an upper threshold 125b, a lower threshold 126b, and a flag 127b corresponding to the second initiator device 160.

Use of the examples of FIG. 1 may reduce instances of "monopolization" of the command buffer 128 by one of the plurality of initiator devices 148. For example, if the first initiator device 150 uses a large portion of the command buffer 128, the command buffer management module 134 may send the message 136 to the first initiator device 150 to indicate that the remaining allowed storage size 138 of the command buffer 128 is relatively low. As another example, the command buffer management module 134 may send the buffer full message 139 to the first initiator device 150. In response to receiving the message 136 or the buffer full message 139, the first initiator device 150 may avoid or delay sending one or more subsequent commands, which may "free up" storage of the command buffer 128 so that other initiator devices of the plurality of initiator devices 148 may utilize the command buffer 128 (resulting in a more "fair" resource management).

Figure 2:
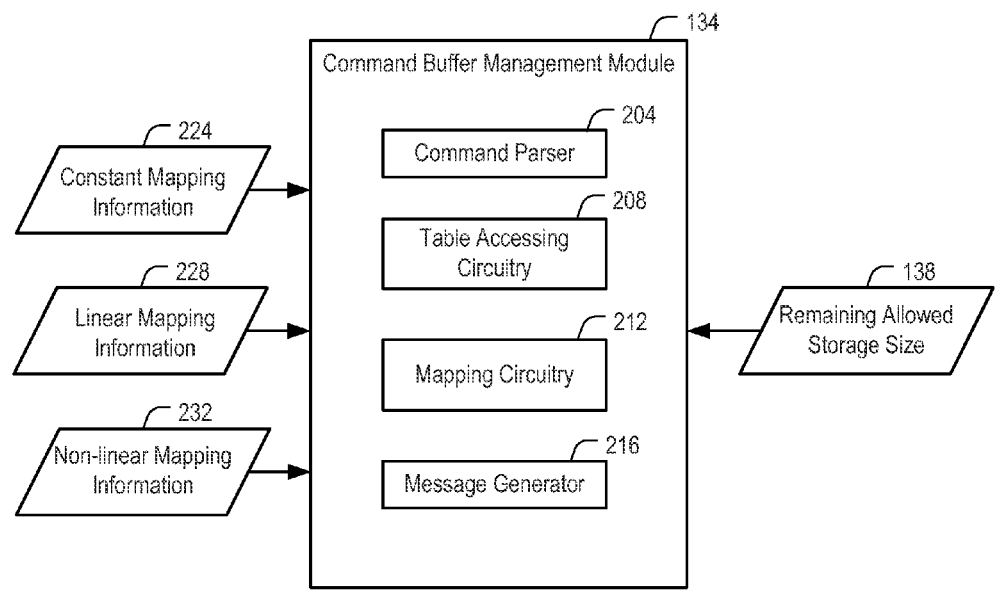
FIG. 2 is a diagram illustrating certain aspects corresponding to an illustrative implementation of the command buffer management module of FIG. 1.
Figure 2:
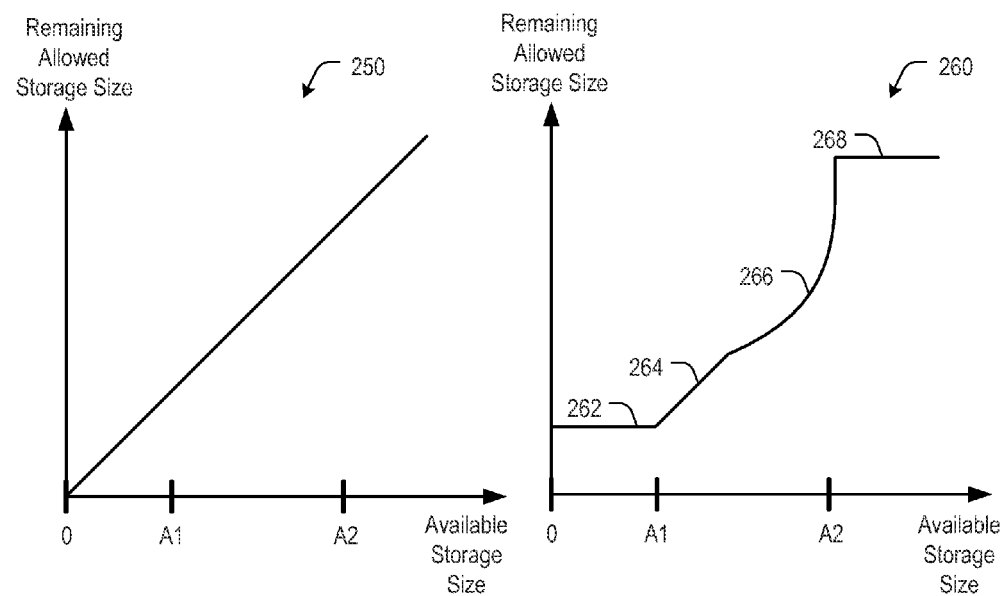

FIG. 2 illustrates certain aspects of an illustrative implementation of the command buffer management module 134. FIG. 2 also illustrates a graph 250 and a graph 260. It should be appreciated that the examples of FIG. 2 are provided for illustration and that other implementations are within the scope of the disclosure. For example, in some implementations, one or more hardware components described herein may be implemented using a processor that executes instructions (e.g., firmware). Those of skill in the art will recognize that other such modifications are within the scope of the disclosure.

In the example of FIG. 2, the command buffer management module 134 includes a command parser 204, table accessing circuitry 208, mapping circuitry 212, and a message generator 216. The command buffer management module 134 may be coupled to the communication interface 144 of FIG. 1.

During operation, the command buffer management module 134 may monitor the communication interface 144 to detect one or more messages received from or sent to the plurality of initiator devices 148. The one or more messages may include one or more commands received from the plurality of initiator devices 148 (e.g., the commands 154, 164), one or more messages provided by the data storage device 102 to the plurality of initiator devices 148 (e.g., a status message or a data frame in response to a read request), or a combination of both.

The command parser 204 may be configured to parse one or more messages received at the communication interface 144 from the plurality of initiator devices 148. To illustrate, the command parser 204 may include circuitry (e.g., logic gates) coupled to the communication interface 144, and the circuitry may be configured to detect one or more of an opcode of a message, a source identifier of a message, or a destination identifier of a message. For example, the command parser 204 may be configured to detect a first source identifier of the first command 154 to determine that the first initiator device 150 originated the first command 154. As another example, the command parser 204 may be configured to detect a second source identifier of the second command 164 to determine that the second initiator device 160 originated the second command 164. As an additional example, the command parser 204 may be configured to detect a destination identifier indicated by a message sent from the data storage device 102 to one of the plurality of initiator devices 148.

In response to identifying one of the plurality of initiator devices 148, the command parser 204 may provide a control signal to the table accessing circuitry 208. The control signal may indicate one of the plurality of initiator devices 148 identified by the command parser 204. For example, the control signal may indicate the first initiator device 150 in response to the command buffer management module 134 detecting the first command 154. As another example, the control signal may indicate the second initiator device 160 in response to the command buffer management module 134 detecting the second command 164.

In response to receiving the control signal from the command parser 204, the table accessing circuitry 208 may access the table 122 of FIG. 1. For example, the table accessing circuitry 208 may input a lookup value to a device (e.g., a RAM) storing the table 122. To further illustrate, the lookup value may indicate the first initiator device 150 or the second initiator device 160. In response to the lookup value, the RAM may provide a value indicated by the table 122 to the table accessing circuitry 208, such as a value indicated by one of the entries 124a, 124b. As an example, if the lookup value indicates the first initiator device 150, the RAM may provide a value associated with the first entry 124a (e.g., the remaining allowed storage size 138, as illustrated in the example of FIG. 2). As another example, if the lookup value indicates the second initiator device 160, the RAM may provide the second remaining allowed storage size described with reference to FIG. 1 to the table accessing circuitry 208.

In response to receiving the remaining allowed storage size 138 from the RAM, the message generator 216 may generate a message, such as the message 136 of FIG. 1. In this example, the message 136 may include the remaining allowed storage size 138 provided by the RAM. In some implementations, the message 136 may be included in a response message, such as a response to a request for read access received from one of plurality of initiator devices 148. The response may correspond to a data frame that complies with a SCSI communication protocol, as an illustrative example.

In another example, the message generator 216 is configured to generate the buffer full message 139 in response to the command buffer management module 134 detecting a command and in response to the remaining allowed storage size 138 failing to satisfy a threshold (e.g., being equal to zero). To illustrate, if the command parser 204 detects the first command 154 at the communication interface 144 and if the remaining allowed storage size 138 indicates that the first portion 130 is "full" (e.g., the remaining allowed storage size 138 is equal to zero), then the message generator 216 may provide the buffer full message 139 to the first initiator device 150.

In some implementations, the table accessing circuitry 208 may be configured to update values indicated by the table 122 (e.g., the entries 124a, 124b) during operation of the system 100. As an illustrative example, if the remaining allowed storage size 138 satisfies a threshold (e.g., is greater than zero), the command buffer management module 134 may store one or more commands received from the first initiator device 150 at the command buffer 128 (e.g., by storing the first command 154 at the command buffer 128). In response to storing the first command 154 at the command buffer 128, the table accessing circuitry 208 may decrement a value indicated by the first entry 124a (e.g., the remaining allowed storage size 138) to decrease a size of the command buffer 128 that is reserved for the first initiator device 150. The table accessing circuitry 208 may be configured to increment a value indicated by the first entry 124a (e.g., the remaining allowed storage size 138) in response to processing of a command stored at the command buffer 128. For example, if the first command 154 is processed (e.g., "taken out of queue"), then the table accessing circuitry 208 may increment the remaining allowed storage size 138 (to increase a size the command buffer 128 that is reserved for the first initiator device 150 and may notify the first initiator device 150 (e.g., by sending a message to the first initiator device 150) that a value of the remaining allowed storage size 138 has increased.

The graph 250 illustrates a "one-to-one" mapping of available storage size and remaining allowed storage size (e.g., to determine a "size" of the portion 130). To illustrate, in the example of the graph 250, increasing an available storage size of the portion 130 by one (e.g., by processing one command associated with the first initiator device 150) may result in the remaining allowed storage size increasing by one. To further illustrate, in the example of the graph 250, decreasing an available storage size of the portion 130 by one (e.g., as a result of storing one command associated with the first initiator device 150 at the command buffer 128) may result in the remaining allowed storage size decreasing by one. In this case, increasing (or decreasing) available storage size of the portion 130 from a value A1 to a value A2 may result in corresponding increase (or decrease) of the remaining allowed storage size.

In other cases, a mapping different than a "one-to-one" mapping may be used. For example, the graph 260 illustrates that, for a particular initiator device, remaining allowed storage size may be constant for a range of available storage sizes 262, may be linear for a range of available storage sizes 264, may be non-linear for a range of available storage sizes 266, and may be constant for a range of available storage sizes 268. The range of available storage sizes 262 may correspond to a "minimum" remaining allowed storage size of the command buffer 128 (e.g., to ensure that a particular initiator device is reserved at least some storage size of the command buffer 128), and the range of available storage sizes 268 may correspond to a "maximum" remaining allowed storage size of the command buffer 128 (e.g., to prevent a particular initiator device from "filling" the command buffer 128).

In an illustrative implementation, the mapping circuitry 212 is configured to retrieve constant mapping information 224, linear mapping information 228, and non-linear mapping information 232 (e.g., from the memory 104 of FIG. 1). The constant mapping information 224 may represent one or more of the graph 250 or the ranges of available storage sizes 262, 268, the linear mapping information 228 may represent the range of available storage sizes 264, and the non-linear mapping information 232 may represent the range of available storage sizes 266. The mapping circuitry 212 may be configured to determine a remaining allowed storage size reserved to a particular initiator device (e.g., the remaining allowed storage size 138 reserved for the first initiator device 150) based on mapping information, such as the constant mapping information 224, the linear mapping information 228, and the non-linear mapping information 232. It is noted that mapping of remaining allowed storage size to available storage size may be "global" (the same for each of the plurality of initiator devices 148) or on a per-device basis (with each of the plurality of initiator devices 148 assigned a respective mapping).

In an illustrative implementation, the mapping information 224, 228, and 232 may be utilized to assign one or more initiator devices a higher priority or lower priority than one or more other initiator devices. To illustrate, use of the range of available storage sizes 262 of the graph 260 may enable the first initiator device 150 to be "guaranteed" a "minimum" storage availability of the command buffer 128. Use of the range of available storage sizes 268 may also enable the first initiator device 150 to be assigned a "maximum" remaining allowed storage size. If the second initiator device 160 is reserved a particular storage size based on the graph 250, then the second initiator device 160 may not be assigned a "minimum" or "maximum" remaining allowed storage size. In this illustrative example, the first initiator device 150 may have a higher priority relative to the second initiator device 160 if the available storage size of the command buffer 128 is relatively low (e.g., if the available storage size is between zero and the value A1). The second initiator device 160 may have a higher priority relative to the first initiator device 150 if the available storage size of the command buffer 128 is relatively high (e.g., if the available storage size is greater than the value A2).

One or more parameters described herein may be configurable, such as during a manufacturing stage associated with the data storage device 102, during an assembly stage (e.g., a packaging process) associated with the data storage device 102, during operation by an end user of the data storage device 102, or a combination thereof. To illustrate, in some cases, the mapping information 224, 228, and 232 may be configurable by a manufacturer of the data storage device 102. Alternatively or in addition, the mapping information 224, 228, and 232 may be configurable using an update, such as a firmware update of the data storage device 102.

Figure 3:
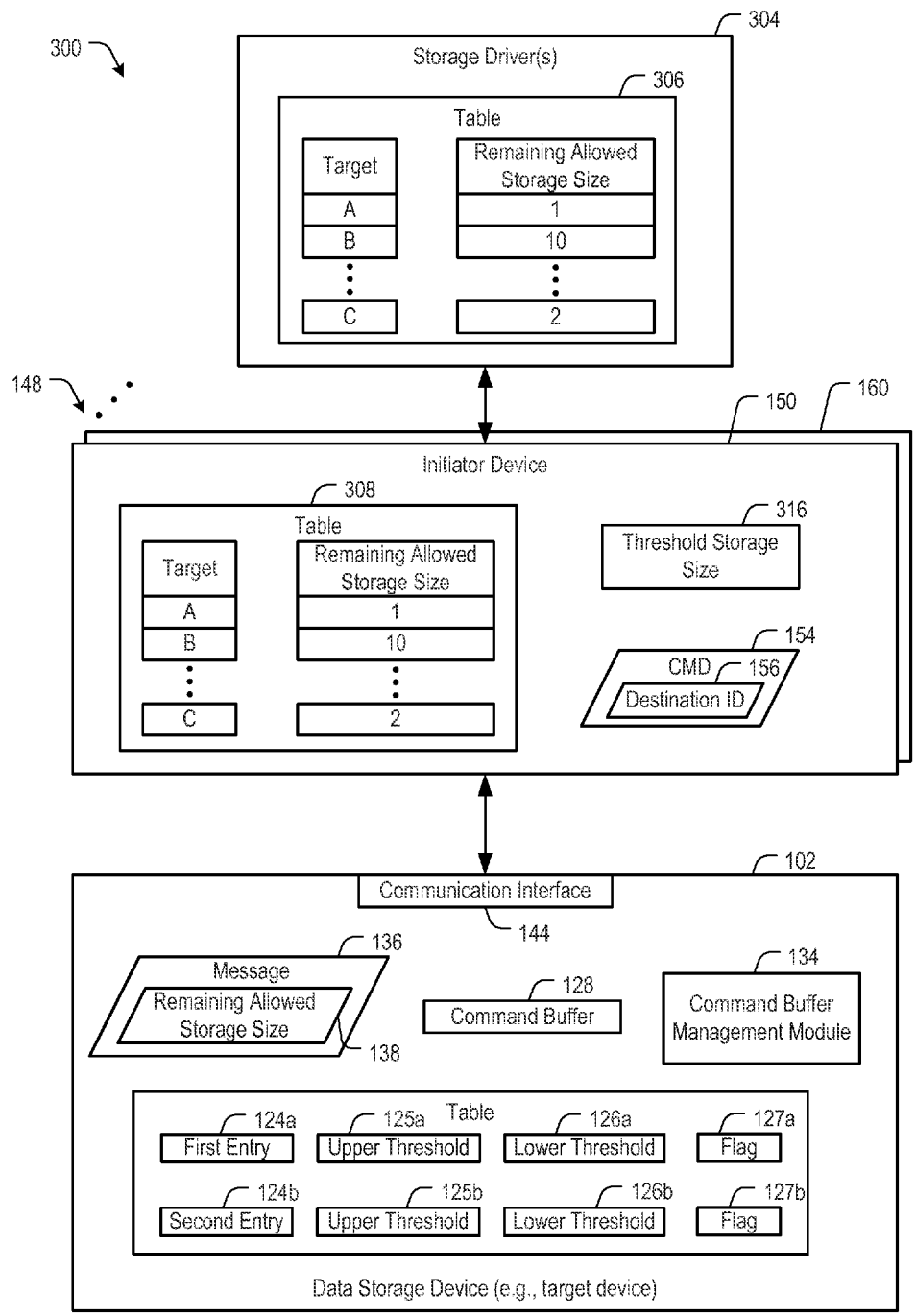
FIG. 3 is a diagram illustrating certain aspects of another illustrative example of a system including a data storage device having a command buffer and a command buffer management module.

Referring to FIG. 3, another illustrative example of a system is depicted and generally designated 300. The system 300 may include one or more storage drivers 304, the plurality of initiator devices 148 (e.g., the first initiator device 150 and the second initiator device 160), and one or more target devices (e.g., the data storage device 102).

In some implementations, the one or more storage drivers 304 and the plurality of initiator devices 148 are integrated within an electronic device, such as an accessing device. For example, the plurality of initiator devices 148 may correspond to logical or virtual devices managed by the one or more storage drivers 304. In some implementations, the one or more storage drivers 304 and the plurality of initiator devices 148 may be included in or may be responsive to an operating system (OS) of a computing device. In other implementations, the plurality of initiator devices 148 may correspond to physical devices managed by the one or more storage drivers 304. Managing the plurality of initiator devices 148 may include instructing the plurality of initiator devices 148 to send commands (e.g., I/O commands), such as the commands 154, 164 of FIG. 1. In some implementations, the one or more storage drivers 304 may be included one or more of the plurality of initiator devices 148.

In the example of FIG. 3, the one or more storage drivers 304 store a table 306, and the first initiator device 150 stores a table 308. The first initiator device 150 may also store an indication of a threshold storage size 316.

During operation, the first initiator device 150 may initiate sending of a command (e.g., the first command 154) to the data storage device 102 (e.g., in response to an instruction from the one or more storage drivers 304). The first command 154 may identify a particular target device. For example, the destination identifier 156 may correspond to a particular target device, such as the data storage device 102.

The first initiator device 150 may access the table 308 to determine a remaining allowed storage size associated with a target device, such as the data storage device 102. In the example of FIG. 3, the table 308 indicates remaining allowed storage sizes (10, 1, . . . 2) for a plurality of target devices (A, B, . . . C). To illustrate, if the data storage device 102 corresponds to target device "A," then the first initiator device 150 may determine a remaining allowed storage size of one.

The first initiator device 150 may compare the remaining allowed storage size to the threshold storage size 316. If the remaining allowed storage size fails to satisfy the threshold storage size 316, the first initiator device 150 may delay or avoid sending the first command 154 to the data storage device 102 (e.g., until one or more commands stored at the command buffer 128 are processed and command buffer management module 134 indicates to the first initiator device 150 that the remaining allowed storage size has increased). As an illustrative example, if the threshold storage size 316 is equal to two, and the remaining allowed storage size is equal to one, then the remaining allowed storage size fails to satisfy the threshold storage size 316. In this case, the first initiator device 150 may delay or avoid sending the first command 154 to the data storage device 102. If the remaining allowed storage size satisfies the threshold storage size 316 (e.g., is equal to two), then the first initiator device 150 may send the first command 154 to the data storage device 102.

The data storage device 102 may receive the first command 154. The data storage device 102 may determine, after receiving the first command 154, whether to process the first command 154 or to "refuse" the first command 154. In a first example, if the number of commands associated with the first initiator device 150 stored at the command buffer 128 does not exceed the upper threshold 125a and if the flag 127a is not asserted, the command buffer management module 134 may store the first command 154 to the command buffer 128. The command buffer management module 134 may also adjust a value of the first entry 124a (e.g., by decrementing the value to indicate that the remaining allowed storage size 138 has decreased in response to storing the first command 154 to the command buffer 128).

In a second example, if the flag 127a is asserted and if the number of commands associated with the first initiator device 150 is not less than the lower threshold 126a, the data storage device 102 may "refuse" the first command 154. For example, the command buffer management module 134 may send the buffer full message 139 to the first initiator device (without storing the first command 154 at the command buffer 128).

In a third example, receiving the first command 154 (and storing the first command 154 at the command buffer 128) may cause the number of commands associated with the first initiator device 150 to exceed the upper threshold 125a. In this example, the data storage device 102 may store the first command 154 at the command buffer 128, may assert the flag 127a, and may update the first entry 124a to indicate that the remaining allowed storage size 138 is equal to zero.

In any of the first example, the second example, and the third example, the command buffer management module 134 may indicate the remaining allowed storage size 138 by sending the message 136 to the first initiator device 150. The first initiator device 150 may update the table 308 based on the remaining allowed storage size 138 indicated by the message 136. As an illustrative example, if the remaining allowed storage size 138 indicates a value of zero and the data storage device 102 corresponds to the target device "A," then the first initiator device 150 may change the value "1" indicated by the table 308 to "0." In some implementations, the remaining allowed storage size 138 may be communicated to the one or more storage drivers 304 (e.g., to enable the one or more storage drivers 304 to update the table 306 based on the remaining allowed storage size 138).

Figure 4:
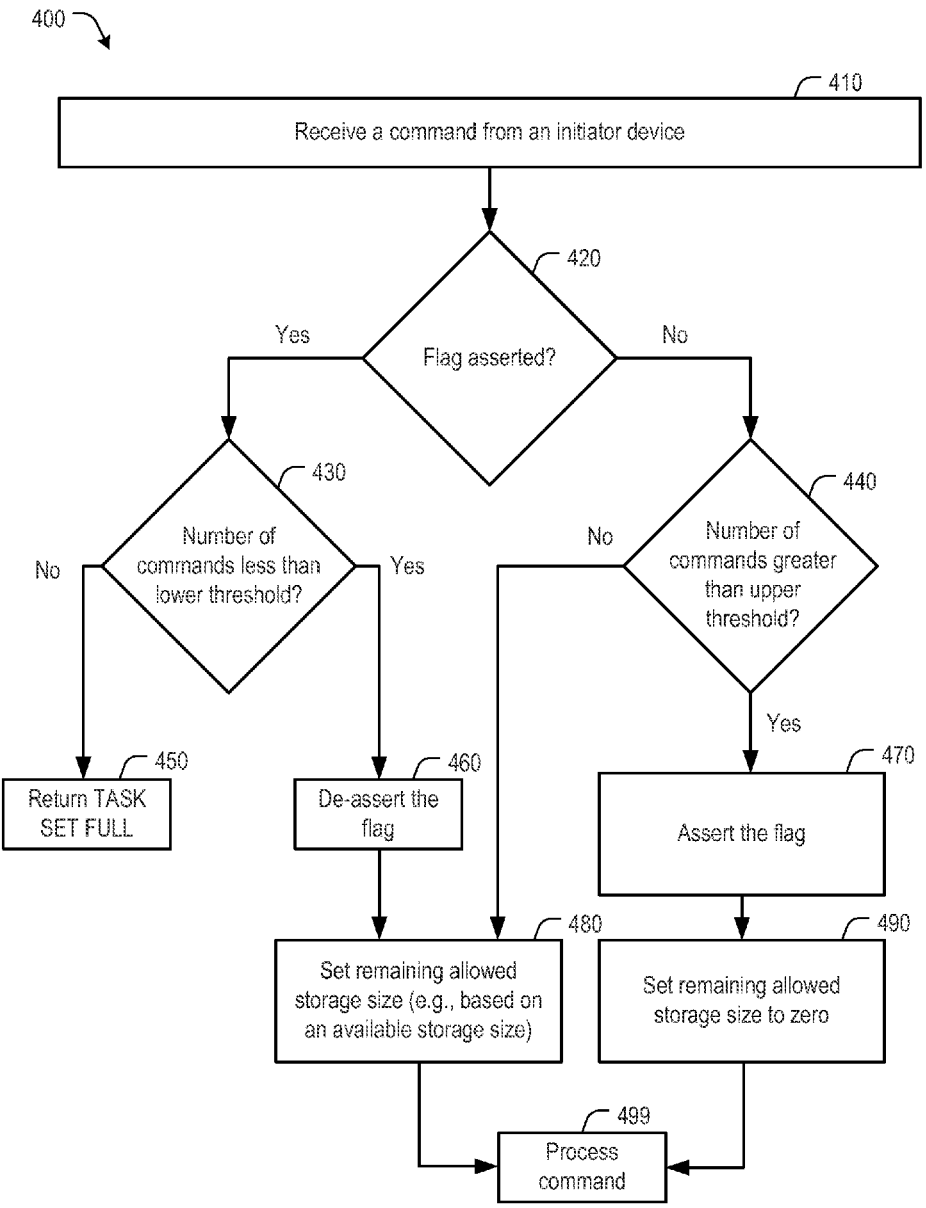
FIG. 4 is a flow diagram of an illustrative example of a method of operation of a data storage device, such as the data storage device of FIGS. 1 and 3.

Referring to FIG. 4, an illustrative example of a method is depicted and generally designated 400. The method 400 may be performed in a data storage device (e.g., the data storage device 102).

The method 400 may include receiving a command from an initiator device, at 410. For example, the data storage device 102 may receive the first command 154 from the first initiator device 150. As another example, the data storage device 102 may receive the second command 164 from the second initiator device 160. The command may be stored at the command buffer 128.

The method 400 may further include determining whether a flag is asserted, at 420. For example, the table accessing circuitry 208 may access the table 122 to determine whether the flag 127a is asserted in response to the first command 154. As another example, the table accessing circuitry 208 may access the table 122 to determine whether the flag 127b is asserted in response to the second command 164.

If the flag is asserted, the method 400 may further include determining whether a number of commands associated with the initiator device stored at the command buffer is less than a lower threshold, at 430. For example, the command buffer management module 134 may determine whether the number of commands is less than the lower threshold 126a. If the number of commands is not less than the lower threshold (i.e., if the number of commands is equal to or greater than the lower threshold), the method 400 may further include returning a TASK SET FULL message to the initiator device, at 450. To illustrate, the TASK SET FULL message may correspond to the buffer full message 139. If the number of commands is less than the lower threshold, the method 400 may include de-asserting the flag, at 460.

If the flag is not asserted, the method 400 may include determining whether the number of commands is greater than an upper threshold, at 440. For example, the command buffer management module 134 may determine whether the number of commands is greater than the upper threshold 125a. If the number of commands is greater than the upper threshold, the method 400 may further include asserting the flag, at 470, and may further include setting the remaining allowed storage size equal to zero, at 490. For example, setting the remaining allowed storage size may include setting a value indicated by the first entry 124a to zero.

The method 400 may further include setting the remaining allowed storage size, at 480. For example, the table accessing circuitry 208 may modify a value of the first entry 124a (e.g., to change the remaining allowed storage size 138). In an illustrative implementation, the remaining allowed storage size is modified based on an available storage size of the command buffer 128. For example, the remaining allowed storage size may be set to a relatively large number if fewer commands are stored at the command buffer 128 (and the command buffer 128 is relatively "empty") and may be set to a smaller number if more commands are stored at the command buffer 128 (and the command buffer 128 is relatively "full"). To further illustrate, the mapping circuitry 212 may select the remaining allowed storage size based on the graph 250 or based on the graph 260 using the available storage size (e.g., by selecting the remaining allowed storage size as a function of the available storage size based on one of the graphs 250, 260).

The method 400 may further include processing the command, at 499. For example, processing the command may include one or more of performing a read operation indicated by the command, performing a write operation indicated by the command, performing an erase operation indicated by the command, or performing another operation. In some implementations, the method 400 further includes sending a response to the initiator device (e.g., in response to processing the command). The response may include the message 136 of FIG. 1. In other implementations, the message 136 may be sent to the initiator device prior to processing the command.

In some implementations, the method 400 may further include sending a response after processing the command. For example, the response may include a status message (e.g., a message indicating a pass status or fail status associated with processing of the command), a data frame in response to a read command, or another message.

Figure 5:
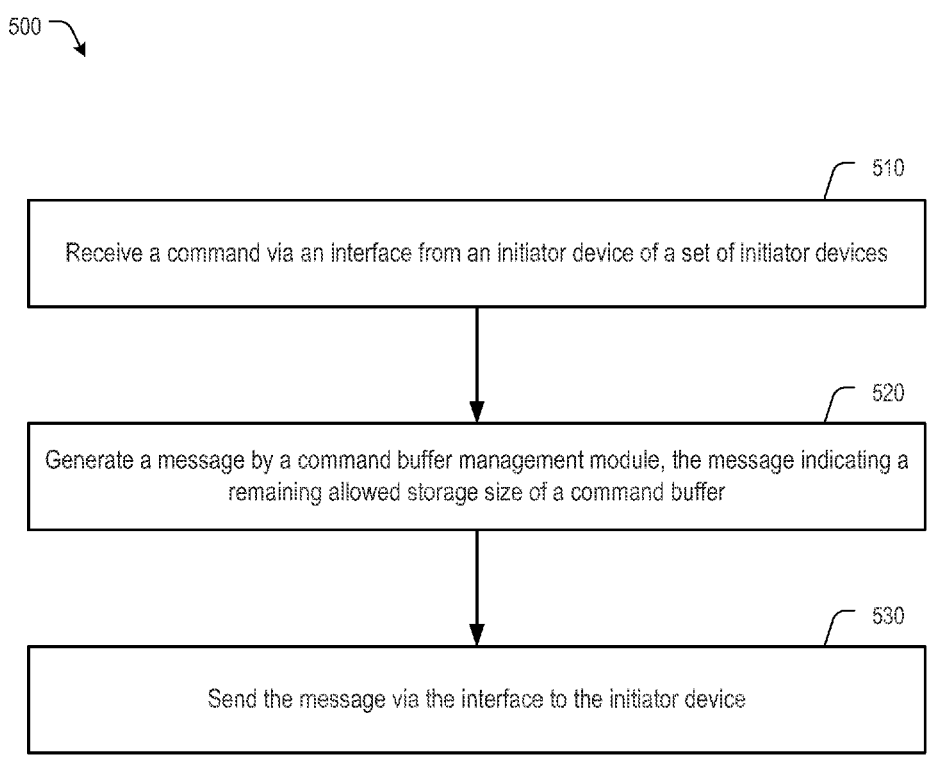
FIG. 5 is a flow diagram of another illustrative example of a method of operation of a data storage device, such as the data storage device of FIGS. 1 and 3.

Referring to FIG. 5, an illustrative example of a method is depicted and generally designated 500. The method 500 may be performed in a data storage device (e.g., the data storage device 102) that includes an interface (e.g., the communication interface 144), a command buffer (e.g., the command buffer 128), and a command buffer management module (e.g., the command buffer management module 134).

The method 500 includes receiving a command via the interface from an initiator device of a set of initiator devices, at 510. For example, the set of initiator devices may correspond to the plurality of initiator devices 148, the initiator device may correspond to one of the initiator devices 150, 160, and the command may correspond to one of the commands 154, 164.

The method 500 may also include storing the command at the command buffer, such as by storing the first command 154 or the second command 164 at the command buffer 128. In this example, the remaining allowed storage size may be determined by the command buffer management module based on an available storage size of the command buffer after storing the command at the command buffer (e.g., the available storage size described with reference to the graph 250, the graph 260, or a combination thereof).

The method 500 may optionally include determining a remaining allowed storage size by the command buffer management module. In some implementations, the table accessing circuitry 208 may access the table 122 (e.g., to access the first entry 124a or the second entry 124b) to determine the remaining allowed storage size. As an additional illustrative example, the table accessing circuitry 208 may access the first entry 124a to determine the remaining allowed storage size 138.

In some implementations, the method 500 includes accessing mapping information indicating the remaining allowed storage size as a function of an available storage size of the command buffer (e.g., a "real" available storage size of the portion 130). For example, the mapping information may correspond to any of the mapping information 224, 228, and 232. The mapping information may be retrieved from the memory 104 or from a memory of the controller 110 (e.g., from a RAM of the controller 110), as illustrative examples. To further illustrate, the mapping may include a linear mapping (e.g., as indicated by the graph 250 or by the range of available storage sizes 264) of the remaining allowed storage size to the available storage size. Alternatively or in addition, the mapping may include a non-linear mapping (e.g., as indicated by the range of available storage sizes 266) of the remaining allowed storage size to the available storage size. Alternatively or in addition, the mapping may include a constant mapping (e.g., as indicated by one or both of the ranges of available storage sizes 262, 268) of the remaining allowed storage size to the available storage size.

The method 500 further includes generating a message by the command buffer management module, at 520. The message indicates the remaining allowed storage size of the command buffer. The message may correspond to the message 136, and the remaining allowed storage size may correspond to the remaining allowed storage size 138, as illustrative examples. In an illustrative implementation, the message is generated by the message generator 216. In some cases, the message is sent while the remaining allowed storage size of the command buffer is greater than zero. In these cases, sending the message to the initiator device before the remaining allowed storage size is equal to zero (or before the command buffer is "full") may reduce or avoid instances of monopolization of the command buffer by the initiator device.

The method 500 further includes sending the message to the initiator device, at 530. For example, the message 136 may be sent to one of the initiator devices 150, 160 using the communication interface 144.

One or more operations of the method 500 may be performed in connection with one or more operations of the method 400. To illustrate, the command received at 510 of FIG. 5 may correspond to the command received at 410 of FIG. 4. In some implementations, generating the message, at 520 of FIG. 5, and/or sending the message, at 530 of FIG. 5, may be performed prior to processing the command, at 499 of FIG. 4 (e.g., prior to determining whether the flag is asserted, at 420 of FIG. 4, as an illustrative example). In other implementation, generating the message, at 520 of FIG. 5, and/or sending the message, at 530 of FIG. 5, may be performed after processing the command, at 499 of FIG. 4. As an illustrative example, the method 400 may further include sending a response after processing the command (such as a status message or a data frame in response to a read command), and the message may be included in the response.

Figure 6:
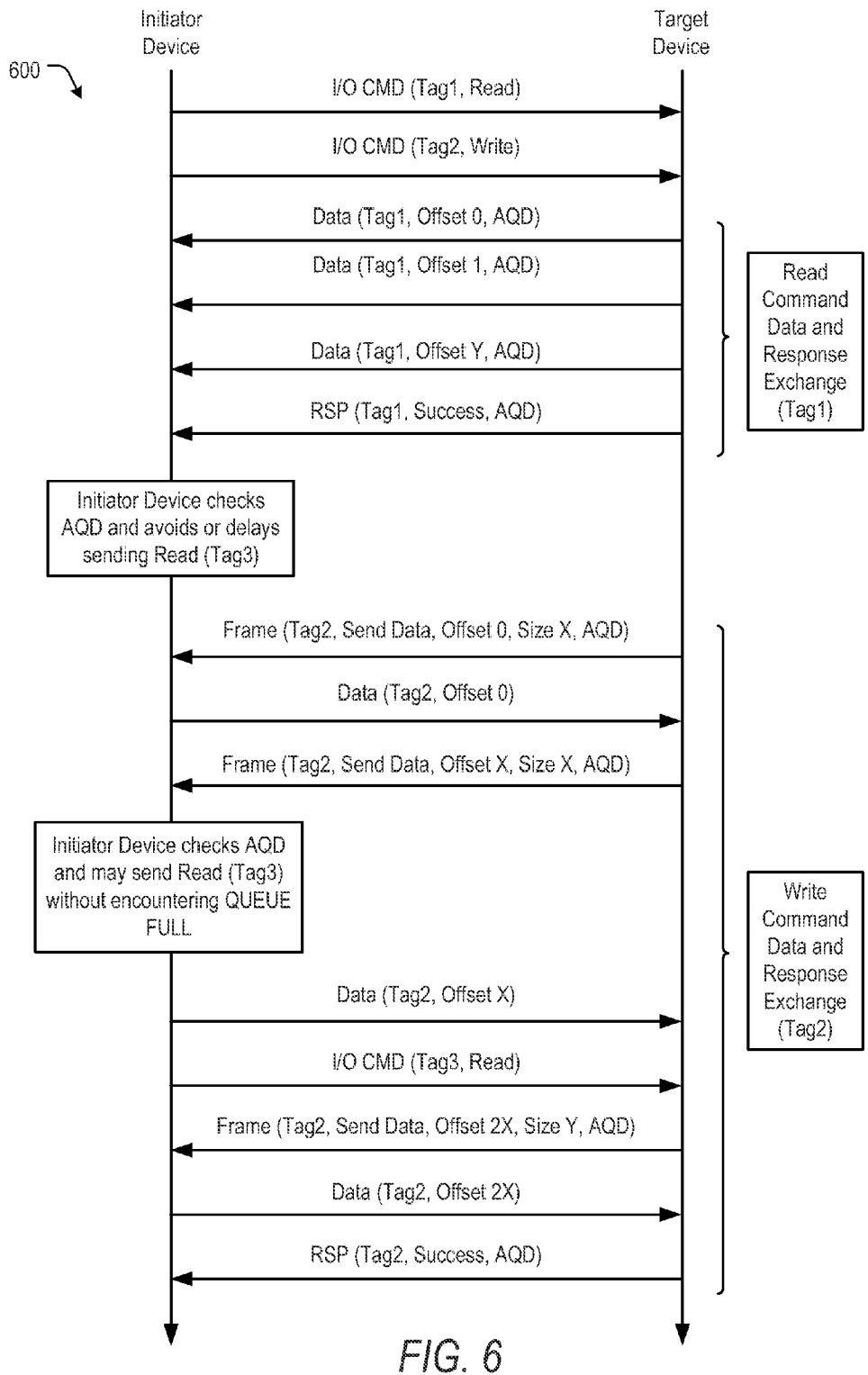
FIG. 6 is a ladder diagram illustrating certain operations that may be performed at a system, such as the system of FIG. 1, the system of FIG. 3, or both.

Referring to FIG. 6, a ladder diagram 600 illustrates certain operations that may be performed at a system, such as at the system 100 of FIG. 1, the system 300 of FIG. 3, or both. For example, the ladder diagram 600 illustrates certain operations of an initiator device (e.g., any of the plurality of initiator devices 148) and a target device (e.g., the data storage device 102).

In FIG. 6, a tag (e.g., Tag1, Tag2, or Tag3) may identify a particular input/output command (I/O CMD), such as any of the commands 154, 164 (e.g., to distinguish a particular command from other commands stored at the command buffer 128). For example, the first command 154 may indicate Tag1 (to distinguish the first command 154 from the second command 164). In FIG. 6, an offset (e.g., Offset 0, Offset 1, Offset Y, Offset X, or Offset 2X) may indicate a data offset between multiple commands. To illustrate, if 0x400 bytes is requested by a particular command, the controller 130 may send a first a data frame that includes 0x200 bytes followed by a second data frame that includes another 0x200 bytes. In this example, a data offset may be equal to 0x200 bytes. In FIG. 6, a size may refer to a length of data to be transferred (e.g., 0x200 bytes in the foregoing example), RSP may indicate a response (e.g., a status response indicating success or failure of an operation), and AQD may indicate an allowed queue depth, such as the remaining allowed storage size 138.

FIG. 6 illustrates that a message sent by a target device may indicate an AQD. For example, FIG. 6 illustrates that a data frame ("Data") or a response ("RSP") may indicate an AQD. The AQD may enable an initiator device to avoid or delay sending one or more commands if the AQD is relatively low. Avoiding or delaying sending one or more commands may reduce "overflow" at the command buffer 128, may reduce or avoid instances of an initiator device "monopolizing" the command buffer 128, may increase available bandwidth by reducing or avoiding "buffer full" messages, or a combination thereof.

An apparatus includes means (e.g., the communication interface 144) for enabling reception of commands (e.g., the commands 154, 164) from a plurality of initiator devices (e.g., the plurality of initiator devices 148) and for enabling communication of a message (e.g., the message 136) to one or more of the plurality of initiator devices. The apparatus further includes means (e.g., the command buffer 128) for storing the commands and also includes means (e.g., the command buffer management module 134) for generating the message. The message indicates a remaining allowed storage size (e.g., the remaining allowed storage size 138) of the means for storing the commands.

Although the command buffer management module 134 and certain other components described herein are illustrated as block components and described in general terms, such components may include one or more microprocessors, state machines, and/or other circuits configured to enable the data storage device 102 (or one or more components thereof) to perform operations described herein. Components described herein may be operationally coupled to one another using one or more nodes, one or more buses (e.g., data buses and/or control buses), one or more other structures, or a combination thereof. One or more components described herein may include one or more physical components, such as hardware controllers, state machines, logic circuits, one or more other structures, or a combination thereof, to enable the data storage device 102 to perform one or more operations described herein.

Alternatively or in addition, one or more aspects of the data storage device 102 may be implemented using a microprocessor or microcontroller programmed (e.g., by executing instructions) to perform operations described herein, such as one or more operations of the method 400, one or more operations of the method 500, one or more operations of the ladder diagram 600, or a combination thereof. In a particular embodiment, the data storage device 102 includes a processor executing instructions (e.g., firmware) retrieved from the memory 104. Alternatively or in addition, instructions that are executed by the processor may be retrieved from a separate memory location that is not part of the memory 104, such as at a read-only memory (ROM).

It should be appreciated that one or more operations described herein as being performed by the controller 110 may be performed at the memory device 103. As an illustrative example, in-memory ECC operations (e.g., encoding operations and/or decoding operations) may be performed at the memory device 103 alternatively or in addition to performing such operations at the controller 110.

The data storage device 102 may be coupled to, attached to, or embedded within one or more accessing devices, such as within a housing of one of the initiator devices 150, 160. For example, the data storage device 102 may be embedded within an accessing device in accordance with a Joint Electron Devices Engineering Council (JEDEC) Solid State Technology Association Universal Flash Storage (UFS) configuration. To further illustrate, the data storage device 102 may be integrated within an electronic device, such as a mobile telephone, a computer (e.g., a laptop, a tablet, or a notebook computer), a music player, a video player, a gaming device or console, an electronic book reader, a personal digital assistant (PDA), a portable navigation device, or other device that uses internal non-volatile memory.

In one or more other implementations, the data storage device 102 may be implemented in a portable device configured to be selectively coupled to one or more external devices, such as a host device. For example, the data storage device 102 may be removable from an accessing device (i.e., "removably" coupled to the accessing device). As an example, the data storage device 102 may be removably coupled to an accessing device in accordance with a removable universal serial bus (USB) configuration.

An accessing device may correspond to a mobile telephone, a computer (e.g., a laptop, a tablet, or a notebook computer), a music player, a video player, a gaming device or console, an electronic book reader, a personal digital assistant (PDA), a portable navigation device, another electronic device, or a combination thereof. The accessing device may communicate via a controller, which may enable the accessing device to communicate with the data storage device 102. The accessing device may operate in compliance with a JEDEC Solid State Technology Association industry specification, such as an embedded MultiMedia Card (eMMC) specification or a Universal Flash Storage (UFS) Host Controller Interface specification. The accessing device may operate in compliance with one or more other specifications, such as a Secure Digital (SD) Host Controller specification as an illustrative example. Alternatively, the accessing device may communicate with the data storage device 102 in accordance with another communication protocol. In some implementations, one or more of the system 100, the data storage device 102, the memory device 103, or the system 300 may be integrated within a network-accessible data storage system, such as an enterprise data system, a network-attached storage (NAS) system, or a cloud data storage system, as illustrative examples.

In some implementations, the data storage device 102 may include a solid state drive (SSD). The data storage device 102 may function as an embedded storage drive (e.g., an embedded SSD drive of a mobile device), an enterprise storage drive (ESD), a cloud storage device, an NAS system, or a client storage device, as illustrative, non-limiting examples. In some implementations, the data storage device 102 may be coupled to an accessing device via a network. For example, the network may include a data center storage system network, an enterprise storage system network, a storage area network, a cloud storage network, a local area network (LAN), a wide area network (WAN), the Internet, and/or another network.

To further illustrate, the data storage device 102 may be configured to be coupled to an accessing device as embedded memory, such as in connection with an embedded MultiMedia Card (eMMC®) (trademark of JEDEC Solid State Technology Association, Arlington, Va.) configuration, as an illustrative example. The data storage device 102 may correspond to an eMMC device. As another example, the data storage device 102 may correspond to a memory card, such as a Secure Digital (SD®) card, a microSD® card, a miniSD™ card (trademarks of SD-3C LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.). The data storage device 102 may operate in compliance with a JEDEC industry specification. For example, the data storage device 102 may operate in compliance with a JEDEC eMMC specification, a JEDEC Universal Flash Storage (UFS) specification, one or more other specifications, or a combination thereof.

The memory 104 may include a three-dimensional (3D) memory, such as a resistive random access memory (ReRAM), a flash memory (e.g., a NAND memory, a NOR memory, a single-level cell (SLC) flash memory, a multi-level cell (MLC) flash memory, a divided bit-line NOR (DINOR) memory, an AND memory, a high capacitive coupling ratio (HiCR) device, an asymmetrical contactless transistor (ACT) device, or another flash memory), an erasable programmable read-only memory (EPROM), an electrically-erasable programmable read-only memory (EEPROM), a read-only memory (ROM), a one-time programmable memory (OTP), or a combination thereof. Alternatively or in addition, the memory 104 may include another type of memory. In a particular embodiment, the data storage device 102 is indirectly coupled to an accessing device via a network. For example, the data storage device 102 may be an NAS device or a component (e.g., a solid-state drive (SSD) component) of a data center storage system, an enterprise storage system, or a storage area network. The memory 104 may include a semiconductor memory device.

Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure. In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate). As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Alternatively, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this disclosure is not limited to the two dimensional and three dimensional exemplary structures described but cover all relevant memory structures within the spirit and scope of the disclosure as described herein and as understood by one of skill in the art. The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments. Those of skill in the art will recognize that such modifications are within the scope of the present disclosure.

The above-disclosed subject matter is to be considered illustrative, and not restrictive, and the appended claims are intended to cover all such modifications, enhancements, and other embodiments, that fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A data storage device comprising:
   a memory device, the memory device including a memory;
   a controller coupled to the memory device, wherein the controller is configured to receive data and commands, wherein the controller further comprises:
   a communication interface configured to receive a read command or a write command from a plurality of initiator devices;
   a command buffer coupled to the communication interface, the command buffer configured to store the command;
   a command buffer management module coupled to the command buffer, the command buffer management module configured to generate a message indicating a remaining allowed storage size of the command buffer, wherein the command buffer module is configured to generate a response indicating success of the read command or the write command, wherein the command buffer module is configured to include the message in the response, and wherein the communication interface is further configured to enable communication of the message to a particular initiator device of the plurality of initiator devices; and a comparator configured to compare destination identifiers of the command to an identifier assigned to the communication interface.

2. The data storage device of claim 1, wherein the communication interface is further configured to enable reception of the read command or the write command from the particular initiator device, and wherein the command buffer management module includes a message generator configured to generate the message in response to the read command or the write command.

3. The data storage device of claim 2, wherein the message enables the particular initiator device to hold off on sending one or more other commands to the command buffer if the remaining allowed storage size fails to satisfy a threshold storage size.

4. The data storage device of claim 1, wherein the communication interface is further configured to operate in compliance with a small computer system interface (SCSI) communication protocol, a serial advanced technology attachment (SATA) communication protocol, or another communication protocol.

5. The data storage device of claim 4, wherein the communication interface is configured to operate in compliance with the SCSI communication protocol, and wherein the message is included in a response frame in compliance with the SCSI communication protocol.

6. The data storage device of claim 1, further comprising a target device, wherein the communication interface, the command buffer, and the command buffer management module are integrated within the target device.

7. The data storage device of claim 1, wherein the command buffer management module is further configured to access a table that includes a first entry indicating the remaining allowed storage size, and wherein the remaining allowed storage size corresponds to a first portion of the command buffer that is reserved for the particular initiator device.

8. The data storage device of claim 7, wherein the plurality of initiator devices further includes at least a second initiator device, and wherein the table further includes a second entry indicating a second remaining allowed storage size of a second portion of the command buffer that is reserved for the second initiator device.

9. The data storage device of claim 7, wherein the table indicates an upper threshold of a number of commands associated with the particular initiator device that may be stored at the command buffer, and wherein the table further indicates a lower threshold of the number of commands associated with the particular initiator device that may be stored at the command buffer.

10. The data storage device of claim 9, wherein the command buffer management module is further configured to generate one or more buffer full messages in response to the number of commands being greater than the upper threshold until the number of commands is less than the lower threshold.

11. A method comprising:
at a data storage device that includes an interface, a command buffer, and a command buffer management module, performing:
receiving a command via the interface from an initiator device of a set of initiator devices;
generating a message by the command buffer management module, the message indicating a remaining allowed storage size of the command buffer; and
sending a response to the initiator device indicating success of an operation indicated by the command, wherein the message is included in the response to the initiator device.

12. The method of claim 11, wherein the message is sent while the remaining allowed storage size of the command buffer is greater than zero.

13. The method of claim 11, further comprising determining the remaining allowed storage size for each initiator device by the command buffer management module.

14. The method of claim 13, further comprising storing the command at the command buffer.

15. The method of claim 14, wherein the remaining allowed storage size is determined by the command buffer management module based on an available storage size of the command buffer after storing the command at the command buffer.

16. The method of claim 11, further comprising accessing mapping information indicating a mapping of the remaining allowed storage size as a function of an available storage size of the command buffer.

17. The method of claim 16, wherein the mapping includes a linear mapping of the remaining allowed storage size to the available storage size.

18. The method of claim 16, wherein the mapping includes a non-linear mapping of the remaining allowed storage size to the available storage size.

19. The method of claim 16, wherein the mapping includes a constant mapping of the remaining allowed storage size to the available storage size.

20. An apparatus comprising:
means for enabling reception of commands from a plurality of initiator devices and for enabling communication of a message to one or more of the plurality of initiator devices;
means for generating a response to send to the plurality of initiator devices indicating success of the commands;
means for storing the commands; and
means for generating the message, wherein the message is included in the response to the plurality of initiator devices, and wherein the message indicates a remaining allowed storage size of the means for storing the commands.

21. The apparatus of claim 20, wherein the means for enabling reception of the commands includes a communication interface to the plurality of initiator devices.

22. The apparatus of claim 20, wherein the means for storing the commands includes a command buffer.

23. The apparatus of claim 20, wherein the means for generating the message includes a command buffer management module.

* * * * *